Patented Aug. 22, 1933

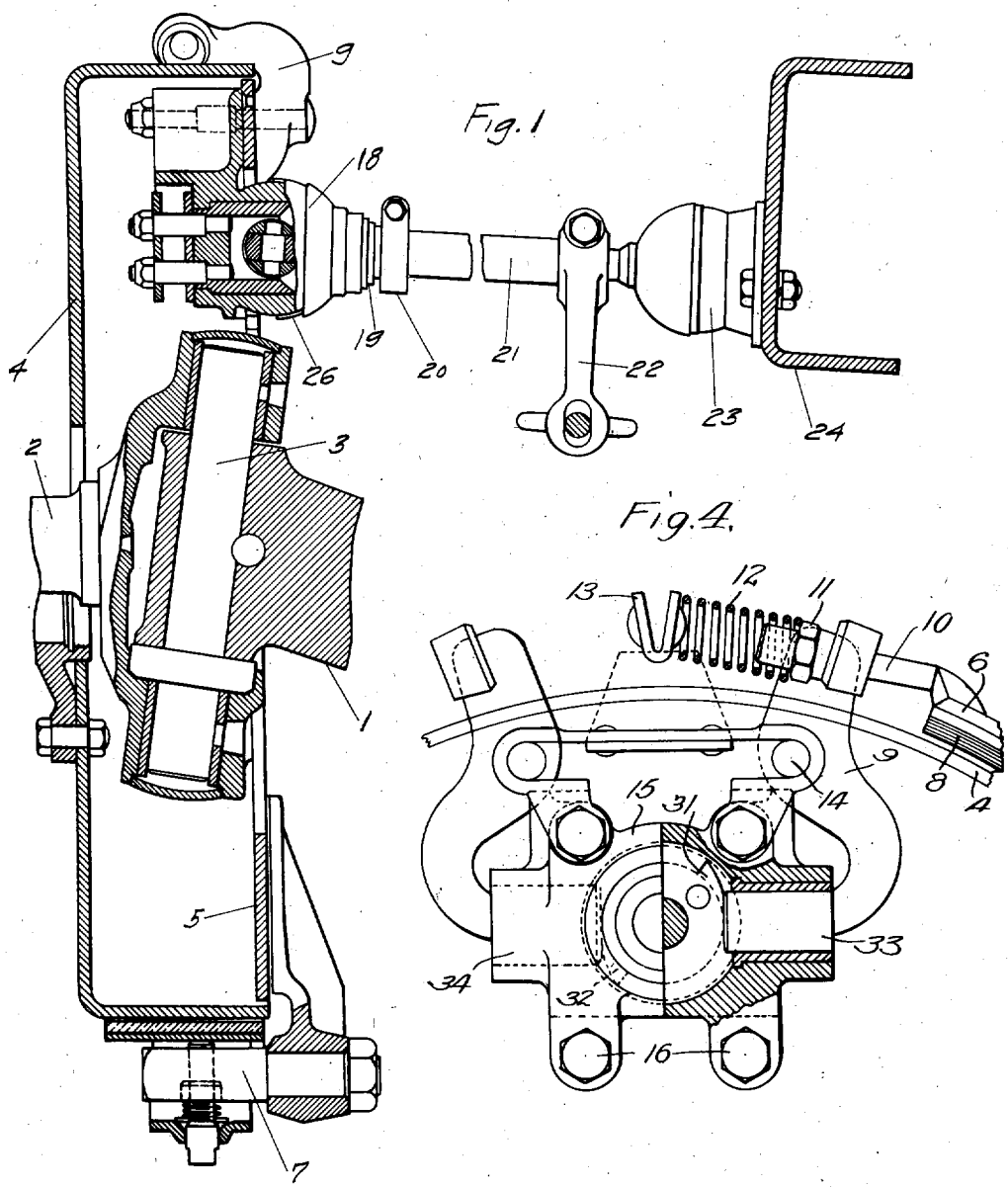

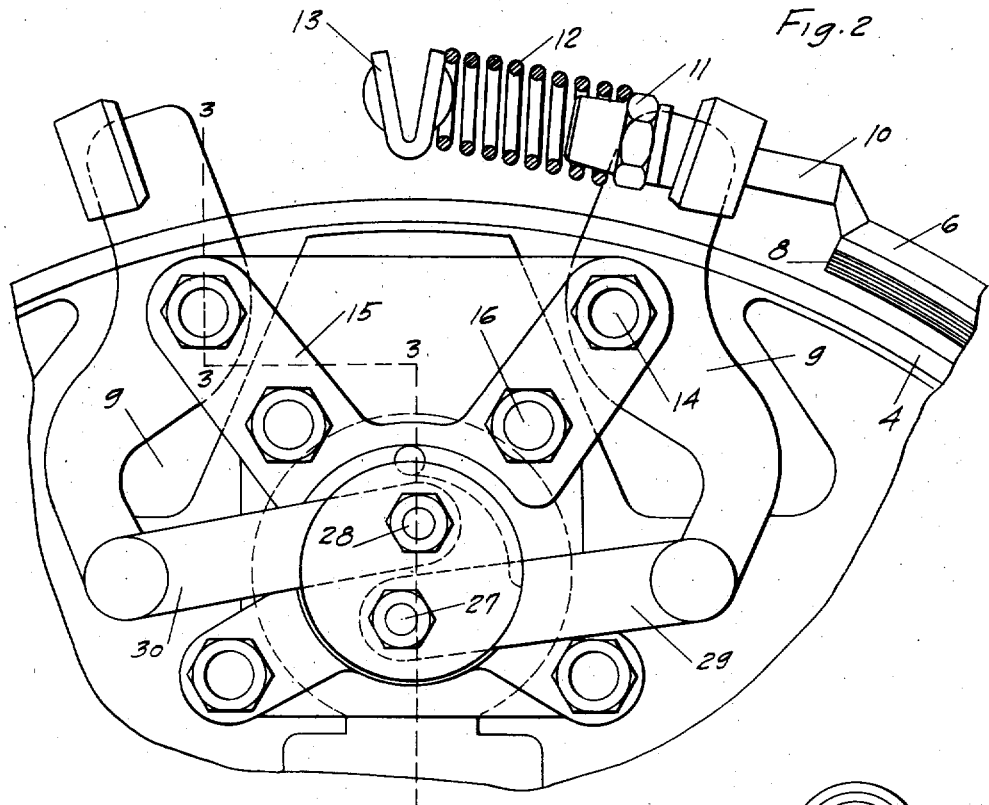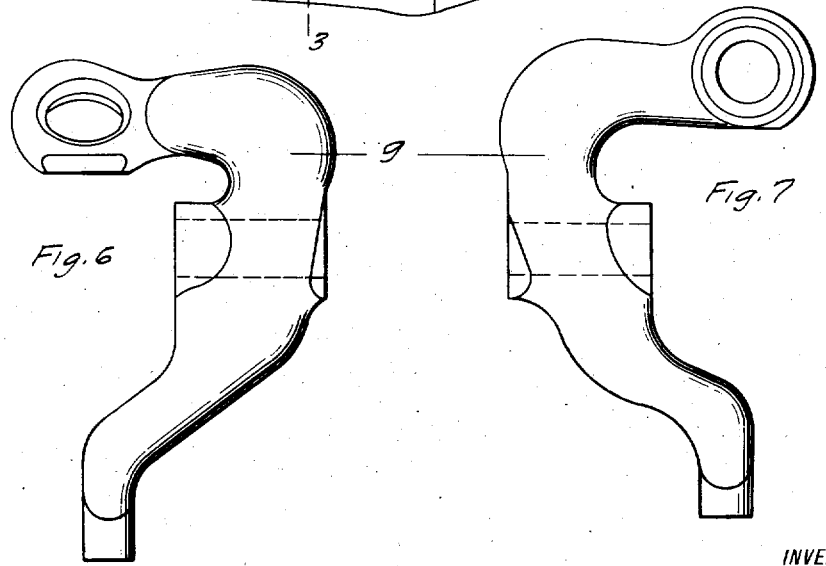

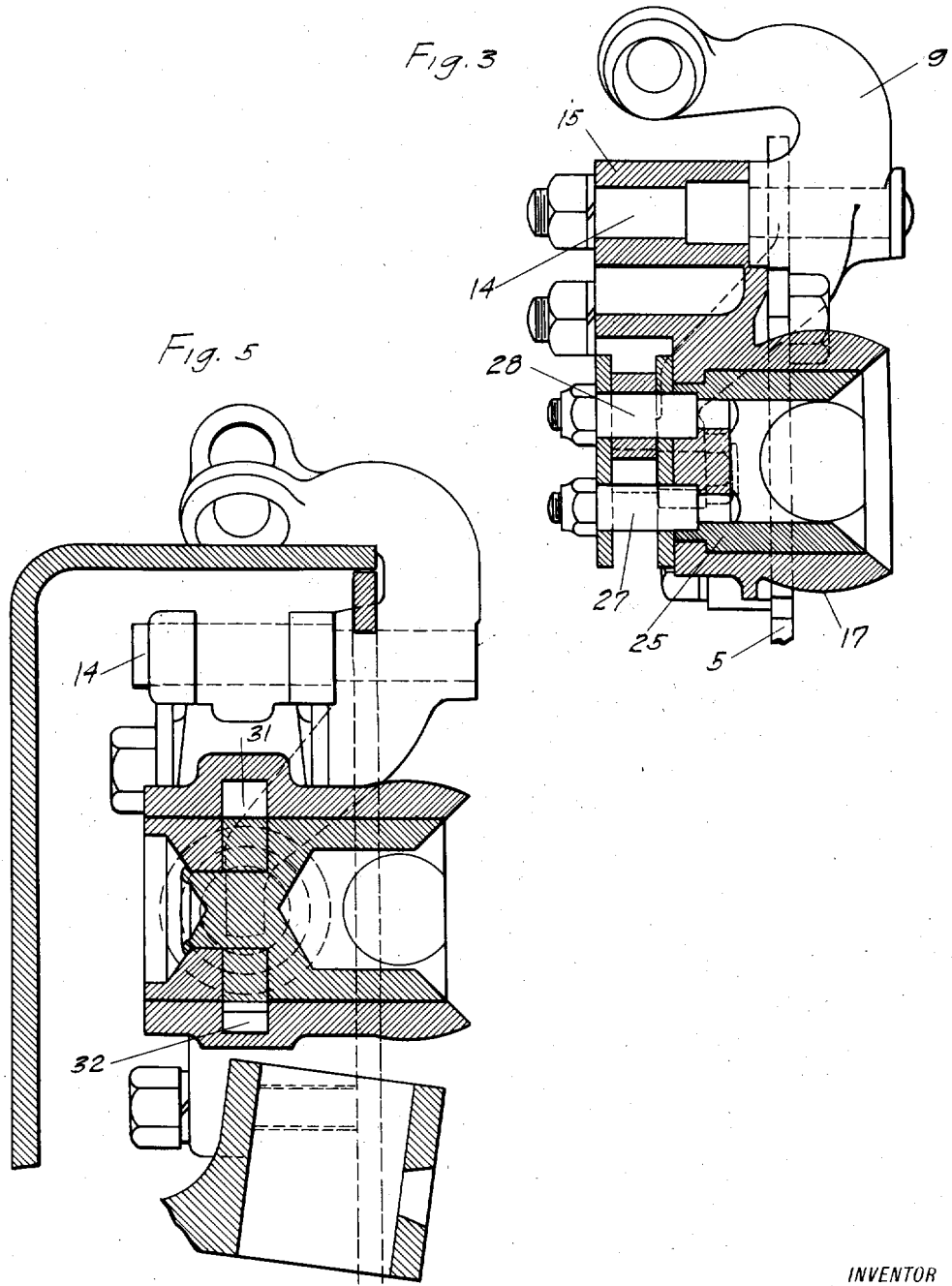

1,923,182

UNITED STATES PATENT OFFICE 1,923,182

BRAKE OPERATING MECHANISM

Vincent Bendix, Chicago, Ill., assignor to Bendix Brake Company, South Bend, Ind., a Corporation of Illinois Application September 12, 1929
Serial No. 292,040

12 Claims. (Cl. 188—194)

This invention relates to mechanisms for actuating external brakes, particularly, those of an automotive vehicle.

It is the principal object of my invention to provide an arrangement whereby external brakes may be operated with mechanical controls of a well known type.

Another object of my invention is to provide an arrangement such that the brakes may be adjusted much more readily than in ordinary forms of external brakes now in use.

Another object of my invention is to provide an arrangement which, from a commercial standpoint, possesses many advantages, one of which is the easy adaptation of the type of mechanical control illustrated in the drawings.

These and other objects and features of the invention, including novel and desirable details of construction and combinations of parts will be apparent from the following description of one illustrated embodiment shown in the accompanying drawings, in which:

Figure 1 is a part sectional view through a vehicle wheel drum.

Figure 2 is a fragmentary view of an enlarged scale from that shown in Figure 1 looking from the inside of the drum toward the wheel showing a preferred form of connection between the brakes and the operating shaft.

Figure 3 is a section on the line 3—3 of Figure 2.

Figure 4 is a view similar to Figure 2 but showing a modified arrangement of some of the details.

Figure 5 is a section similar to Figure 3; and

Figures 6 and 7 are side views of the levers connected between the brakes and the operating shaft.

In the drawings wherein like numbers refer to corresponding parts in various views, 1 is a vehicle axle having a wheel spindle 2 pivoted thereon through the medium of the usual pivot pin 3. The wheel, which is not shown, has a brake drum 4, which is substantially closed by the cover plate 5 that fits around and is attached to that part of the wheel spindle carrying the pivot pin 3. Supported in operative position around the outer periphery of drum 4 are brakes, only one of which 6, is illustrated; the bottom support for this being generally referred to by the numeral 7 as indicated in the drawings. The brake shoe or band 6 has braking material 8, of suitable character, attached thereto in any well known and satisfactory manner. The end of the brake 6 is fastened to the upper end of a lever 9 through the medium of a bolt 10 and an adjusting nut 11. A return spring 12 having an abutment 13 is used to return the brake to its normal position after it has been released. Lever 9 is pivoted by the bolt 14 to a carrier bracket or support member 15, which bracket or support member is mounted within the drum and preferably carried on the plate 5 in any satisfactory manner as by four bolts 16 (see Figures 2 and 4). The carrier bracket or support member has a part 17 projecting through the plate 5, which part has a spherical surface for the reception of a dust and protecting cover 18 which is held in place by a spring 19 and a clip 20 on a control rod 21. The control rod 21 is operated by a control lever 22 which is connected to the usual brake actuating rod.

The inner end of the control shaft 21 has preferably a ball and socket supporting member 23 attached to some non-rotating part of the vehicle such as the chassis 24. The member 23 is of such a character so as to allow the control shaft 21 its necessary freedom of movement in all the directions which it may assume in operation. The portion 17 serves to support and house the rotatable member 25 which constitutes one part of a universal joint, another part of the joint being composed of an end 26 of the control shaft 21. The details of the universal joint form no part of the present invention and will, therefore, not be described in details herein. In the construction shown in Figure 3, the inner end of the operating member 25 has a pair of studs 27 and 28 fastened thereto in any satisfactory manner. On these studs are attached links 29 and 30 which are pivoted to the levers 9, thereby completing an operative connection between the control shaft and the brake. In the form shown in Figure 4, a rotatable member 25 carries cams 31 and 32 which act against the members 33 and 34 which in turn co-operate with the levers 9 to complete an operating connection with the brakes.

As will be seen in the various figures, the levers 9 have one end extending within the drum and the other end projecting up over the edge of the drum for connection with the brakes. It will also be observed that the portion 17 of the carrier bracket or support member carries the universal joint which preferably is mounted so as to be within the axis of the pivot pin, although the joint may be located at any point desired.

It will be apparent that numerous changes may be made in the details for carrying out my invention, without departing from the spirit of my invention and the scope of the appended claims.

I claim:

1. In combination, mechanism for actuating brakes external to a rotating vehicle wheel drum, comprising, a support member housed within the drum, a rotatable member, carried by said support member, levers carried on said support member and having one end thereof extending without the drum and connected to said brakes, the other end of said levers being operatively connected to said studs, and a control shaft having one end connected to said rotatable member and another part supported on a non-rotatable part or the vehicle.

2. In combination, mechanism for actuating brakes external to a rotating vehicle wheel drum, comprising a support member housed within the drum, a rotatable member carried by said support member, levers carried on said support member and having one end thereof extending without the drum and connected to said brakes, the other end of said levers having a linked connection to said rotatable member, and a control shaft having one end connected to said rotatable member through a universal joint and the other end supported on a non-rotating part of the vehicle.

3. In combination, mechanism for actuating brakes external to a rotating vehicle wheel drum comprising a support member housed within the drum, a rotatable member forming an element of a universal joint carried by said support member, levers carried on said support member and having one end thereof extending without the drum and connected to said brakes, the other end of said levers being linked to radially spaced projections on the end of said rotatable member, and a control shaft having one end formed to act as a part of said universal joint and the other end supported on a non-rotating part of the vehicle.

4. In combination, mechanism for actuating brakes external to a rotating vehicle wheel drum comprising a support member housed within the drum, a rotatable member carried by and housed within said support member and forming an element of a universal joint, levers carried on said support member and having one end thereof extending without the drum and connected to said brakes, the other end of said levers being operatively connected to said rotatable member to rotate said levers in either direction, and a control shaft having one end entering said housing support and forming another element of said universal joint, the other end of said control shaft having a ball and slip joint connection with a non-rotating part of the vehicle.

5. In combination, mechanism for actuating brakes external to a rotating vehicle wheel drum comprising a support member housed within the drum, and having a part extending without the drum and serving as a universal joint housing, a rotatable member carried by and housed by said extending part of the support, said rotatable member forming one element of a universal joint, levers carried on said support member and having one end thereof extending without the drum and connected to said brakes, the other end of said levers being linked to studs secured to the end of said rotatable member, and a control shaft having one end forming another part of said universal joint with a joint cover fitting over said projecting part of the support member, the inner end of said control shaft being movably mounted on a non-rotating part of the vehicle.

6. In combination, mechanism for actuating brakes external to a rotating vehicle wheel drum comprising a support member housed within the drum, a rotatable member carried by said support member, levers carried on said support member and having one end thereof extending without the drum and connected to said brakes, links connected at one end to said levers and at their other ends to said rotatable member and a control shaft having one end connected to said rotatable member through a universal joint, the inner end of said control shaft being movably mounted on a non-rotating part of the vehicle.

7. In combination, mechanism for actuating brakes external to a rotating vehicle wheel drum, comprising a support member housed within the drum, a rotatable member carried by said support member, and constituting a part of a universal joint, levers pivoted on said support member and extending without and upwardly over the periphery of the drum and having connections at these ends to said brakes, links pivoted to the other end of said levers and to said rotatable member, a control shaft having one end forming another part of the universal joint, and a mounting for the other end of the control shaft permitting freedom of movement thereof.

8. Means for actuating brakes external to a vehicle wheel drum comprising a control shaft having one end movably mounted on a non-rotating part of the vehicle and the other end forming a part of a universal joint, another part of the joint consisting of a rotatable member, a support member for the joint members within the drum and having a part extending without the drum to a point where said joint is supported in the axis of the wheel spindle, levers carried on said support member and having ends extending without the drum and connected to said brakes, said levers having their inner ends connected by links to said rotatable joint member and adapted to move said levers in either direction.

9. Means for actuating brakes external to a vehicle wheel drum comprising levers attached to said brakes over the outside of the drum, said levers extending within the drum, a control shaft and a rotatable member having a linked connection to said levers, said shaft and rotatable member being united by a universal joint and a support member for carrying said levers, the rotatable member and universal joint.

10. Brake mechanism comprising a drum, a backing plate for said drum, a universal joint, a support member carried by the backing plate having a portion forming a part of the universal joint, a control rod mounted for universal movement in said universal joint, a friction member, and a lever pivoted on said support member and actuated by said rod for operating said friction member.

11. Brake mechanism comprising a drum, a backing plate therefor, friction means associated with said drum, a support member mounted within said drum on said backing plate, a rotatable member supported by said support member, a pair of levers mounted on said support member for pivotal movement, a pair of links connecting said levers to said rotatable member, and connections between said levers and said friction member.

12. Braking mechanism comprising a drum, a brake band outside of said drum, a backing plate secured to said drum, a support member secured within said drum to said backing plate, a universal joint having a part formed by said support member, a rotatable member housed in said supporting member, a control rod, supported for universal movement by said universal joint, a pair of levers pivotally mounted on said support member and each connected at its opposite ends to said friction member outside of said drum and to said rotatable member within said drum.

VINCENT BENDIX.